Jan. 22, 1963  P. BALTEAU  3,075,139
3-PHASE VOLTAGE REGULATORS
Filed Jan. 19, 1959
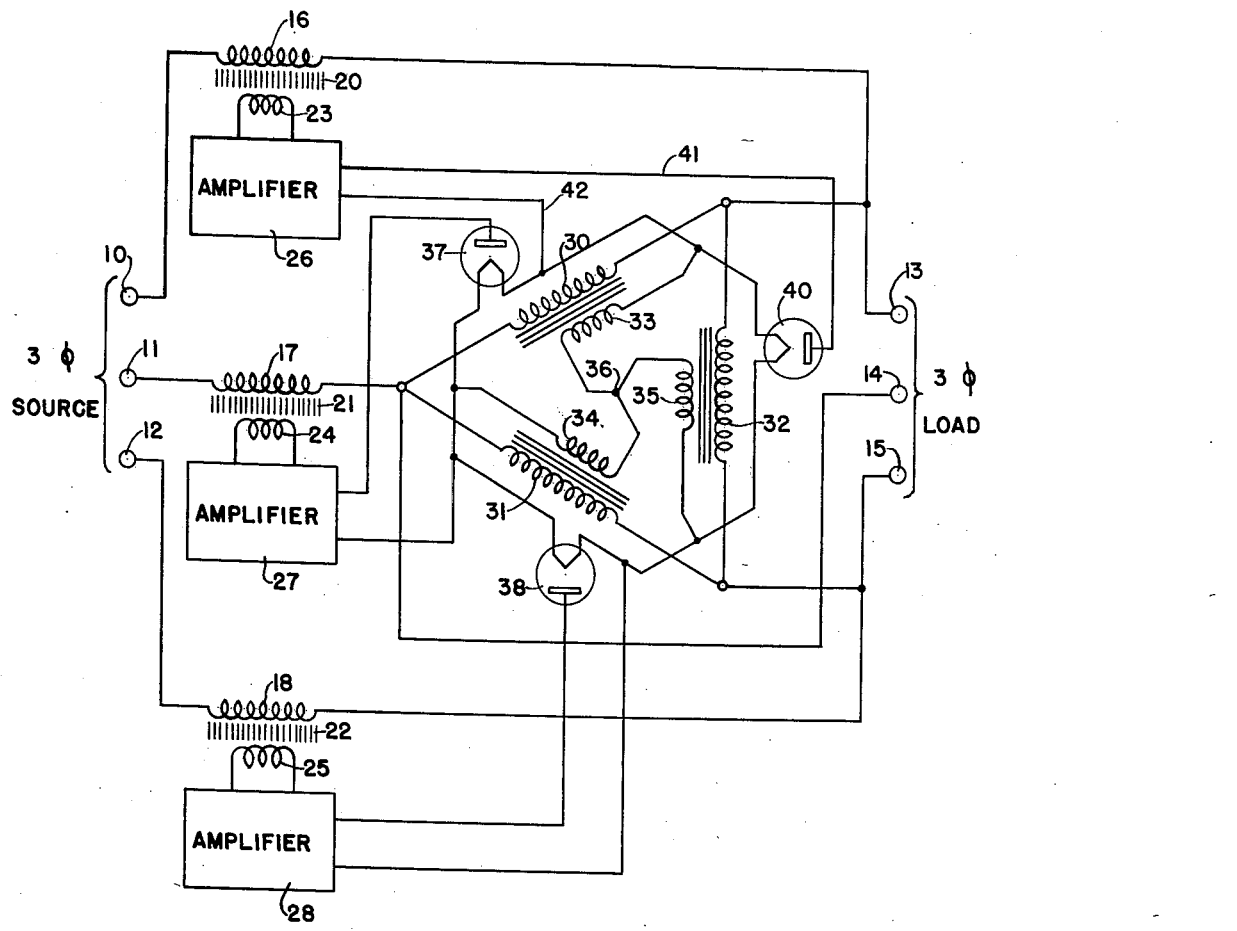
PIERRE BALTEAU
INVENTOR
BY Ralph W. E. Bitner
ATTORNEY 3,075,139
3-PHASE VOLTAGE REGULATORS
Pierre Balteau, Stamford, Conn., assignor, by mesne assignments, to Raytheon Company, Lexington, Mass., a corporation of Delaware
Filed Jan. 19, 1959, Ser. No. 787,457
2 Claims. (Cl. 323—66)

This invention relates to a voltage regulator for a three phase alternating current power supply connected to a three phase load. It has particular reference to a regulator which adjusts the voltages on each phase to maintain them within a small range of values and in addition, makes this adjustment on all phases so as to keep the system balanced.

Single phase voltage regulators are well-known and many have been built and succesfully employed for single phase work. These regulators employ some sort of variable impedance in series in a supply line and the impedance is adjusted in value to maintain a constant voltage. The load voltage may be sensed by means of a sensing circuit in order to control the series impedance.

The application of the single phase regulator to a three phase system is difficult because each phase is connected through two supply lines and if a single sensing circuit is connected to each phase load and controls thereby a single variable impedance, the variation of voltage on one phase may cause its voltage to be regulated but the other two phases are also adjusted and the system is thrown out of balance.

The present invention employs three series impedances, one for each supply line, controllable by the error voltages derived from the three phase load. Each impedance is controlled by the combination of two error voltages which are derived from the phase loads having a common connection to that supply line. Since each load is connected to two supply lines, a single error voltage detected across any load circuit controls the variation of two series impedances. This combination regulates the voltage on all three phase loads and maintains the system in balance.

One of the objects of this invention is to provide an improved three phase voltage regulator which avoids one or more of the disadvantages and limitations of prior art arrangements.

Another object of the invention is to regulate the voltages on all three phases of a three phase supply system without throwing the system out of balance.

Another object of the invention is to provide a three phase voltage regulator with a minimum of equipment and expense.

The invention comprises a three phase voltage regulator for connection between a three-wire supply and a three terminal load. A variable impedance is connected in series between each of said supply lines and its corresponding load terminal. Electrical means are provided for varying said impedances responsive to an error voltage. The error voltages, above or below a predetermined desired load voltage, are determined by sensing means connected across each of the three load terminals. Coupling means are provided for combining pairs of the sensing means and control the series impedance connected in the line which is common to the sensed pair.

For a better understanding of the present invention, together with other and further objects thereof, reference is made to the following description taken in connection with the accompanying drawing.

The drawing is a schematic diagram of connections of the voltage regulator.

Referring now to the drawing, the regulator circuit includes three terminals 10, 11, and 12, which are to be connected to a three phase source of alternating current power supply. The circuit also includes three load terminals 13, 14, and 15, which are to be connected to a three phase load. Each input terminal is connected to a corresponding load terminal in series with a variable impedance 16, 17, and 18. In the drawing these variable impedances are shown as saturable reactors, each having a saturable core 20, 21, and 22, and including a direct current control coil 23, 24, and 25. However, it is understood that other types of variable impedances may be used such as the anode-cathode circuit of a vacuum tube triode or any other type of variable impedance which can be controlled by electrical means. In the circuit shown the control coils 23, 24, and 25, are connected to the output terminals of amplifiers 26, 27, and 28.

The load voltages between terminals 13, 14, and 15, are sensed by a sensing circuit which includes three transformers having primary windings 30, 31, and 32, connected between pairs of output load terminals. The secondaries 33, 34, and 35, have one of their terminals connected to a common point 36 while the other terminals are each connected to one side of a filament in filamentary diodes 37, 38, and 40. It will be obvious that each of the filaments obtains its voltage from two of the transformer secondaries connected in series; for example, the filament in diode 40 obtains its power from windings 33 and 35.

The anode of each diode is connected to one of the amplifier circuits 26, 27, and 28, and one end of the filament of each diode is connected to the same amplifier. For example, the anode of diode 40 is connected by means of conductor 41 to the input circuit of amplifier 26 and at the same time the upper filament terminal of diode 40 is also connected by means of conductor 42 to the same amplifier circuit.

Amplifier 26 may include a bridge circuit for the generation of an error voltage derived from diode 40. Such a circuit is shown and described in United States Patent 2,455,143, issued on November 30, 1948, to E. M. Sorensen. Other amplifier circuits and connections showing single phase voltage regulators of this type are disclosed in Patent 2,569,500, issued to E. M. Sorensen on October 2, 1951. The tubes shown in the drawing 37, 38, and 40, are filamentary diodes whose anode-cathode resistance varies with the filament temperature. Such a tube, with a filament failure device, has been disclosed in Patent No. 2,576,014, issued November 20, 1951, to Helterline, Best, and Bunblasky.

It should be pointed out that the impedance of winding 16 is controlled by the resistance of diode 40, the filament of which is coupled to two sensing circuits which are connected across terminals 13—14 and 13—15, the common terminal 13 being connected directly to variable impedance 16. The other two sensing circuits and their associated variable impedances 17 and 18, have similar connections.

In order to describe the operation of this circuit let it be assumed that the load connected to terminals 13 and 15 is reduced in impedance value thereby drawing more current through impedances 16 and 18 and lowering the voltage momentarily across these output terminals. This change in voltage is sensed by transformer windings 32 and 35 and a reduced voltage appears across the terminals of secondary winding 35. The result of this change is a reduction of the filament voltage applied to diode 40 because this filament is connected to secondary windings 35 and 33. Also, the filament of diode 38 receives a reduced current and voltage because its terminals are connected to secondary windings 35 and 34. The net result of this single reduction in voltage is the change in impedance in diodes 38 and 40 and this change, when applied to control coils 23 and 25 through amplifiers 26 and 28, results in a reduction in the impedance of reactors 16 and 18 to return the voltage across terminals 13 and 15 to its desired regulated value.

While diodes have been employed in the present circuit to translate values of voltage to a change in current in a control coil it is obvious that other types of sensing components may be used such as zener diodes, standard batteries, or voltage regulator tubes in combination with rectifier circuits.

The foregoing disclosure and drawing are merely illustrative of the principles of this invention and are not to be interpreted in a limiting sense. The only limitations are to be determined from the scope of the appended claims.

I claim:

1. A three phase voltage regulator for connection between a three-wire supply and a three terminal load comprising, a variable impedance connected in series between each of said supply lines and a load terminal, control means for varying each of said impedances, a filamentary diode coupled to each of said control means, and transformer coupling means connected to said three load terminals for combining pairs of load terminals and to add the sensed voltages of each pair and apply them to the filaments of said diodes.

2. A three phase voltage regulator for connection between a three wire supply and a three terminal load comprising; a saturable reactor connected in series between each of said supply lines and a load terminal; said saturable reactors each including a saturable ferromagnetic core and a direct current control winding on the core, a filamentary diode connected by coupling means to each of said load terminals; said coupling means including a transformer primary connected across each of said load terminals, a secondary winding for each primary winding, and connections for joining pairs of secondary windings in series and applying the free ends of said windings to the filaments of said diodes, and amplifiers each having its input coupled to the anode-filament circuit of one of said diodes, and its output connected to one of said direct current control windings.

References Cited in the file of this patent

UNITED STATES PATENTS

| | | |
|---|---|---|
| 2,569,500 | Sorensen | Oct. 2, 1951 |
| 2,723,352 | Sealey | Nov. 8, 1955 |

FOREIGN PATENTS

| | | |
|---|---|---|
| 596,123 | Germany | Apr. 27, 1934 |
| 863,031 | France | Mar. 21, 1941 |